United States Patent [19]

Cunningham et al.

[11] 4,197,507

[45] Apr. 8, 1980

[54] SUPPRESSING PULSE SYNTHESIZER

[75] Inventors: Robert E. Cunningham, Northridge; Philip H. Bush, Granada Hills, both of Calif.

[73] Assignee: The United States of America as represented by the Secretary of the Navy, Washington, D.C.

[21] Appl. No.: 894,462

[22] Filed: Apr. 7, 1978

[51] Int. Cl.² .................... H03K 5/13; H03K 5/153; H03K 5/18; H03K 13/32
[52] U.S. Cl. .................................... 328/120; 328/61; 328/63; 328/14
[58] Field of Search ................. 328/120, 60, 61, 63, 328/14

[56] References Cited

U.S. PATENT DOCUMENTS

| 3,080,487 | 3/1963 | Mellott et al. | 328/120 X |
|---|---|---|---|
| 3,138,759 | 6/1964 | Thompson | 328/120 X |
| 4,004,162 | 1/1977 | Kato et al. | 328/120 X |

Primary Examiner—John S. Heyman
Attorney, Agent, or Firm—Richard S. Sciascia; Joseph M. St. Amand; Darrell E. Hollis

[57] ABSTRACT

A supressing pulse synthesizer for supplying the proper average number of synchronization pulses from a reproduced reference signal to an analog to digital converter utilized to convert analog data present on a magnetic tape to digital data.

16 Claims, 17 Drawing Figures

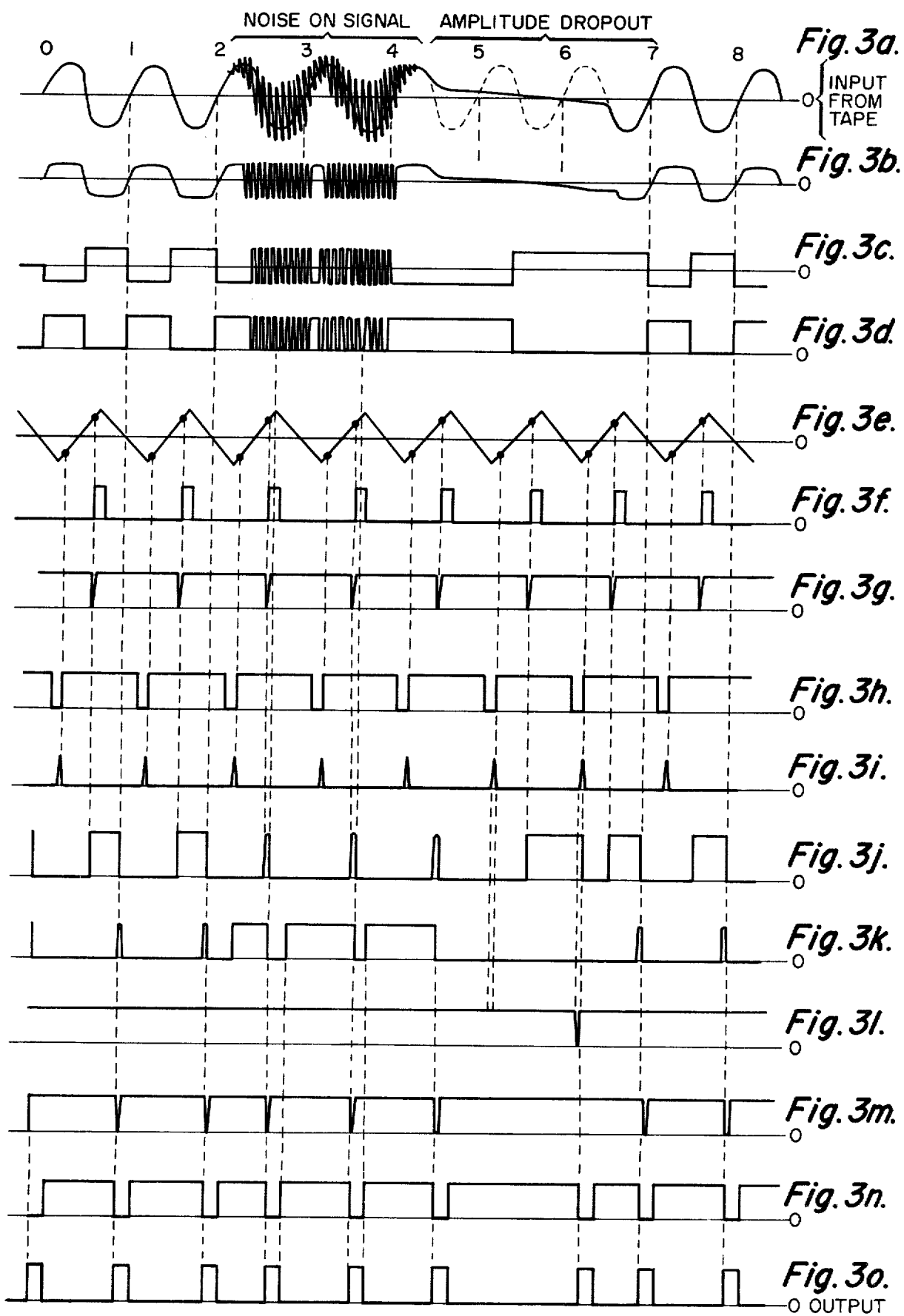

SUPPRESSING PULSE SYNTHESIZER

BACKGROUND OF THE INVENTION

1. Field of the Invention

The present invention relates generally to pulse synthesizers and more particularly to such synthesizers for use in processing data present in analog form on a magnetic tape.

2. Description of the Prior Art

In the recording of analog data onto magnetic tapes it is a common practice to record a digitizing reference signal with highly stable frequency at the same time the analog data is recorded. On playback, this reference signal is utilized to synchronize an analog to digital converter. Since the reference signal is subjected to many of the same variations in tape speed that the data is subjected to, the effects of these variations will cancel out in the digital data.

One short coming of this method is that analog tape recordings are subject to amplitude drop out due to imperfections in the magnetic material present on the tape. In addition, for various reasons, extraneous noise spikes appear on reproduced analog tape data. Thus, if a drop out or an extraneous noise spike appears on the digitizing reference signal it can produce a large error in the time base of the digital data. What is needed is a method of obtaining the correct average number of digitizing pulses from the analog tape reference signal.

One prior art method of obtaining the correct average number of digitizing pulses from an analog tape reference signal consists of tracking the average frequency of the reference signal with a phase-lock-oscillator and then utilizing the output of the phase-lock-oscillator to synchronize the A-D converter. The major disadvantage of this method is that fast phase fluctuations in the reference signal are not followed.

Another prior art method which has been utilized consists of following the average reference signal frequency with a phase-lock-oscillator but supplying the analog-to-digital synchronization pulses directly from the reference signal itself. In this method, if a pulse from a reference signal fails to appear within a specified time interval after it is expected, pulses are synthesized from the output of the phase-lock-oscillator. As soon as the pulses are again received directly from the reference signal, the phase-lock-oscillator output is suppressed. This method supplies the proper average number of synchronization pulses for the case of drop out but it has no provision for suppressing extra pulses due to extraneous zero crossings of the reference signal caused by noise being present upon the reference signal.

SUMMARY OF THE INVENTION

The present invention overcomes the disadvantages and limitations of the prior art by providing an improved suppressing pulse synthesizer. The present invention utilizes a phase-lock-oscillator having a time constant of sufficient duration to maintain a correct average frequency during intervals of missing reference signals. When the reference signal is present, one pulse is generated in response to the zero crossings of the reference signal for each cycle of the reference signal. When the reference signal is missing, one pulse is synthesized in response to a signal from the phase-lock-oscillator for each cycle of the reference signal. When the reference signal is missing for a time interval greater than a predetermined time period, no pulses are generated or synthesized.

It is therefore an object of the present invention to provide an improved suppressing pulse synthesizer.

Another object of the present invention is to provide a suppressing pulse synthesizer for supplying synthesized pulses to analog tapes replacing reference pulses lost due to tape imperfections.

Another object of the present invention is to provide a suppressing pulse synthesizer which is reliable in operation and inexpensive to manufacture.

Another object of the present invention is to provide a suppressing pulse synthesizer which will follow the rapid fluctuations in phase of the reference signal due to instantaneous time displacement errors of magnetic tape machines.

Other objects and further scope of applicability of the present invention will become apparent in the detailed description given hereafter. The detailed description indicates the preferred embodiments of the invention and is given by way of illustration only since various changes and modifications within the spirit and scope of the invention will become apparent to those skilled in the art from this detailed description when considered in connection with the accompanying drawings in which like reference numerals designate like parts throughout the figures thereof and wherein.

It should be understood that the foregoing abstract of the disclosure is for the purpose of providing a nonlegal brief statement to serve as a search scanning tool for scientists, engineers, and researchers and is not intended to limit the scope of the invention as disclosed herein nor is it intended that it should be used in interpreting or anyway limiting the scope or fair meaning of the impending claims.

BRIEF DESCRIPTION OF THE DRAWINGS

FIG. 3A through FIG. 3o are signals representative of those produced by the embodiment of FIG. 1.

DETAILED DESCRIPTION OF THE PREFERRED EMBODIMENT

Figure 1:
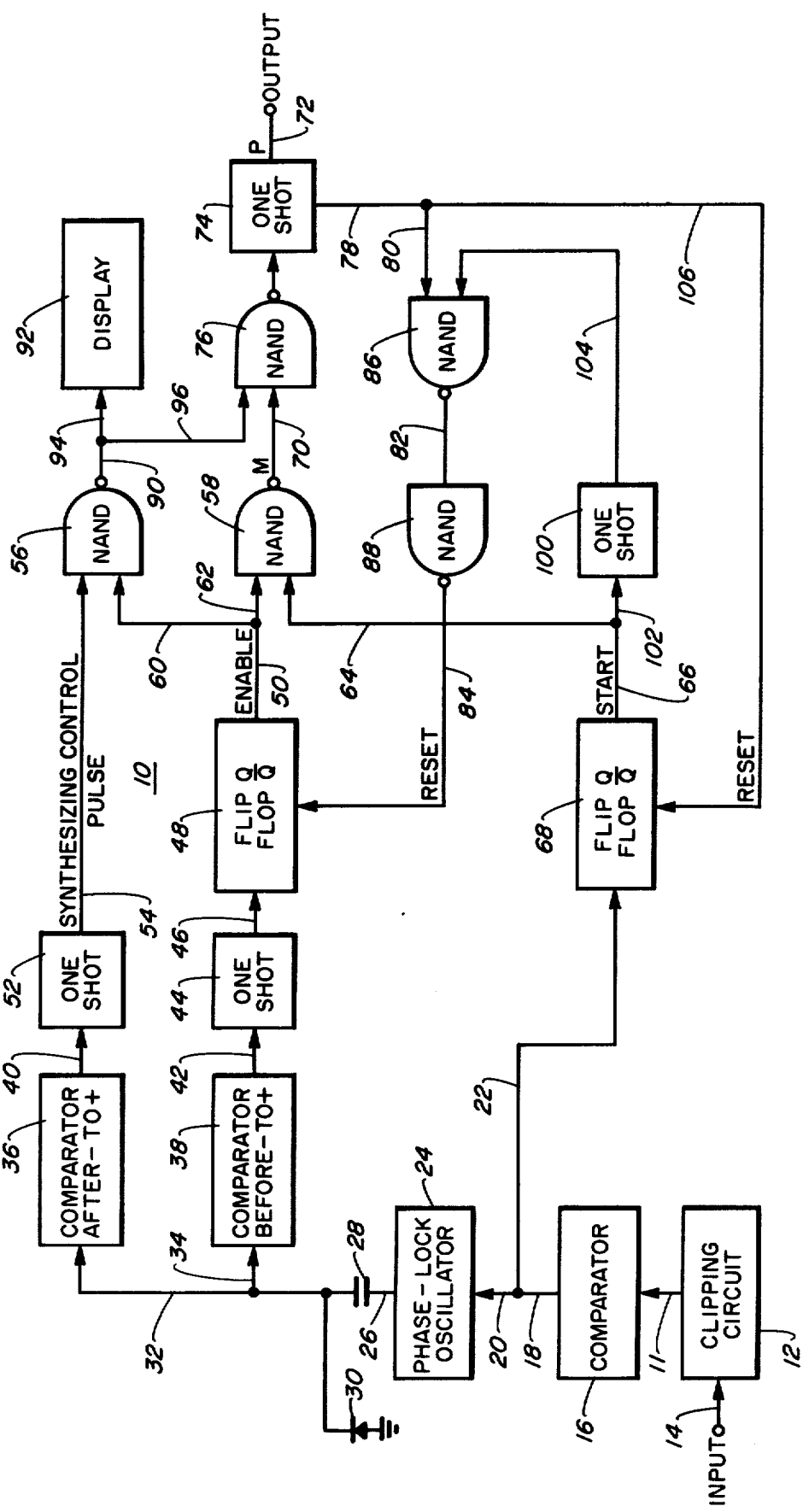
FIG. 1 is a block diagram illustrating one embodiment of the present invention.

FIG. 1 is a schematic illustration of the overall system operation of the preferred embodiment of the suppressing pulse synthesizer designated by the numeral 10.

The input signal coupled to clipping circuit 12 via line 14 is a digitizing reference signal which was recorded on an analog magnetic tape with a highly stable frequency at the same time analog data was recorded on the magnetic tape. On playback, this reference signal is utilized to synchronize an analog-to-digital converter which converts the analog data to digital form. As the reference signal is subjected to the same variations in tape speed and tape imperfections that the data is subject to the effects of these variations are cancelled out in the digital data.

However, analog tape recordings are subject to amplitude drop out due to imperfections in the magnetic material on the tape. Also, for various reasons, extraneous noise spikes may appear on reproduced analog tape data. If a drop out or extraneous noise spike appears on the digitizing reference signal, it may produce a large error in the time base of the digital data.

The clipping circuit 12 and comparator 16 detect the minus-to-plus zero cross over of the input signal on line 14 (which is a sinosoidal wave form) and convert the detected signal to a TTL logic voltage level for driving subsequent circuits.

The input signal on line 14 is shown in FIG. 3A with cycles 1 and 2 being an undegraded signal. Cycles 3 and 4 illustrate the reference signal having noise riding thereon. Cycles 5, 6 and part of 7 represent amplitude drop out of the reference signal. Part of cycles 7 and all of 8 represent a return to the undegraded reference signal.

The signal coupled to comparator 16 from clipping circuit 12 is illustrated in FIG. 3B. The comparator 16, which exhibits a small amount of hysteresis to maintain stability, inverts the signal once again and provides the proper TTL logic voltage level at its output on line 18. The signal on line 18 is illustrated in FIG. 3D. The output of comparator 16 on line 18 is coupled to phase-lock-oscillator 24 via line 20.

Phase-lock-oscillator 24 is designed to track the frequency of the signal on line 18 with a long term constant. The frequency of the output of phase-lock-oscillator 24 on line 26, triangular wave as shown in FIG. 3E, represents the average of the frequency of the signal on line 18 so long as phase-lock-oscillator 24 remains in its locked condition. The output of phase-lock-oscillator 24 on line 26 is a triangle wave with constant amplitude whose frequency represents the average frequency of the input signal on line 18.

Phase-lock-oscillator 24 is designed to capture and oscillate at the nominal frequency of the input. The closed loop dynamic response for certain applications are approximately as follows: natural frequency $W_n \approx 396$ rad/sec, loop damping $\delta \approx 0.707$ and noise bandwidth BL 210 Hz.

Capacitor 28 and diode 30 displace the triangle wave on line 26 such that the negative peaks do not go below the forward diode drop of diode 30 which is approximately minus $\frac{1}{2}$ volt. Capacitor 28 and diode 30 avoid null shift variations introduced by imbalanced power supply voltages within phase-lock-oscillator 24.

The output of phase-lock-oscillator 24 appearing on line 26 is coupled to comparators 36 and 38 via lines 32 and 34, respectively. The switching points of comparators 36 and 38 are illustrated in FIG. 3E as dots on the triangular wave form. The upper dots (those above 0) correspond to the threshold or switching point of comparator 38 while the lower dots (those below 0) correspond to the threshold or switching point of comparator 36. The output of comparator 38 appearing on line 42 is illustrated in FIG. 3F while the output of comparator 36 appearing on line 40 is illustrated in FIG. 3H. As shown in FIG. 3F and FIG. 3H, when triggered, comparator 36 and 38 generate a pulse onto lines 40 and 42, respectively.

The output of comparator 38 on line 42 is coupled to monostable multivibrator 44. Each positive transition of the pulse on line 42 triggers monostable multivibrator 44 thereby generating a pulse which appears on line 46 and is coupled to the set direct connection of flip-flop 48 via line 46. The pulse appearing on line 46 sets flip-flop 48 so that the signal on line 50 goes high until flip-flop 48 is reset. The output of flip-flop 48 appearing on line 50 and designated the enable signal is illustrated in FIG. 3J. Note that the enable signal on line 50 is set high prior to the minus-to-plus zero crossing of the AC input signal illustrated in FIG. 3A.

The output of comparator 36 appearing on line 40 is coupled to one-shot 52. Each positive transition of the pulse on line 40 causes the one-shot 52 to trigger thereby generating a pulse on line 54. Notice the synthesizing control pulse on line 54 is synthesized after the minus-to-plus zero crossing of the AC input signal shown in FIG. 3A. The synthesizing control pulse signal on line 54 is illustrated in FIG. 3I.

The enable signal on line 50 is coupled to NAND gate 56 and 58 via lines 60 and 62, respectively. NAND gate 58 also receives a start signal from flip-flop 68 via lines 64 and 66. The signal on line 18 is coupled to flip-flop 68 via line 22. The flip-flop 68 is set or the signal on line 66 goes high at the exact time of the negative-to-positive zero crossing of the AC input signal shown in FIG. 3A. With the enable signal on line 50 and the start signal on line 66 both high the output of NAND gate 58 on line 70 is driven low thereby causing an output pulse to be generated on line 72 from one-shot 74. Whenever the output of NAND gate 58 on line 70 is driven low, NAND gate 76 will cause one-shot 74 to fire thereby generating an output pulse on line 72. The compliment of the output pulse from one-shot 74 appears on line 78 which is coupled to the reset input of flip-flop 48 via lines 80, 82, and 84 and NAND gates 86 and 88. When reset, flip-flop 48 generates a low on line 50 and will not generate a high on line 50 until a pulse is received from one-shot 44 on line 46.

In addition, the inverted pulse on line 78 is coupled to the reset input of flip-flop 68 via line 106 to reset flip-flop 68 once an output pulse on line 72 has been generated. When reset, flip-flop 68 generates a low on line 66 and will not generate a high on line 66 until the negative-to-positive zero crossing of the AC input signal shown in FIG. 3A.

Thus, as long as AC input signal shown in FIG. 3A is present, i.e., is of sufficient amplitude to cause a signal on line 22 shown in FIG. 3D to drive flip-flop 68, an output pulse will be generated on line 72 at the negative-to-positive zero crossing of the AC input signal shown in FIG. 3A. Therefore, in this case only one output pulse for each cycle of the AC input signal shown in FIG. 3A will be generated on line 72.

When the enable signal on line 50 is high and the synthesizing control pulse on line 54 is present, the output of NAND gate 56 goes low thereby generating an output pulse on line 72. The output of NAND gate 56 is coupled via lines 90 and 94 to display 92 and to NAND gate 76 via lines 90 and 96. Thus, as long as the amplitude of the AC input signal shown in FIG. 3A is of sufficient magnitude to generate a signal on line 22 to fire flip-flop 68 an output pulse is generated on line 72 and flip-flop 48 is reset before the synthesizing control pulse on line 54 is generated thereby suppressing the synthesization of a pulse by one-shot 74 during that period of one cycle of the AC input signal shown in FIG. 3A. However, when the amplitude of the AC input signal shown in FIG. 3A is of insufficient magnitude to trigger flip-flop 68 then the enable signal which is generated prior to the negative-to-positive zero crossing of the AC input signal shown in FIG. 3A is not reset prior to the generation of the synthesizing control pulse on line 54 thereby causing a synthesized output pulse to appear on line 72. Thus, when amplitude drop out occurs in the AC input signal shown in FIG. 3A, the synthesizing pulse generator 10 continues to output one pulse per cycle of the AC input signal shown in FIG. 3A.

The start signal on line 66 is also coupled to one-shot 100 via line 102. One-shot 100 has a time constant which is much greater than the time period of the AC input signal shown in FIG. 3A. When the output of flip-flop 68 on line 66 goes high, one-shot 100 is triggered. Once flip-flop 68 fails to trigger one-shot 100 for a time period greater than the time constant of one-shot 100, one-shot 100 via lines 82 and 84 and NAND gates 86 and 88 will provide a continuous reset signal to flip-flop 48 thereby shutting off both the pulse synthesizing and the pulse generating process of suppressing synthesizing pulse generator 10. Of course, when the AC input signal shown in FIG. 3A returns, flip-flop 68 is triggered thereby triggering one-shot 100 which removes the reset signal on line 84 to flip-flop 48.

The period of one-shot 100 sets the length of time pulse generator 10 will continue to synthesize pulses during the absence of an input signal on line 14 of FIG. 1. This time period is set such that it is longer than the time period of drop out experienced on magnetic tapes. For certain types of magnetic tape this time period is approximately 100 milliseconds.

During conditions of noise on the AC input signal shown in FIG. 3A in cycles 3 and 4 the negative-to-positive zero crossing will occur early because of the presence of noise. This premature zero crossing induced by noise will set flip-flop 68 thereby causing the start signal on line 66 to go high before enable signal on line 50 hoes high. However, this does not cause a premature output pulse on line 72 as both the enable signal on line 50 and the start signal on line 66 must be high before NAND gate 58 will propagate a low on line 70 which will fire one-shot 74 via NAND gate 76. Immediately after the generation of an output pulse on line 72 flip-flop 48 is reset and will not trigger again until the next cycle of the AC input signal. Thus, even though immediately after flip-flop 68 is reset it is triggered prematurely by noise present on the AC input signal, still only one pulse per cycle will be generated on line 72.

It is noted that whenever suppressing pulse synthesizing generator 10 is forced to synthesize a pulse, this synthesized pulse will not occur at exactly the same time that the missing AC input signal would have crossed zero from negative to positive. However, the result will be the equivalent of a transient phase shift in the digital data while the effect of a missing or added sample would appear as a large permanent phase shift in the digital data. The generated and synthesized output pulses are shown in FIG. 3o.

Figure 2:
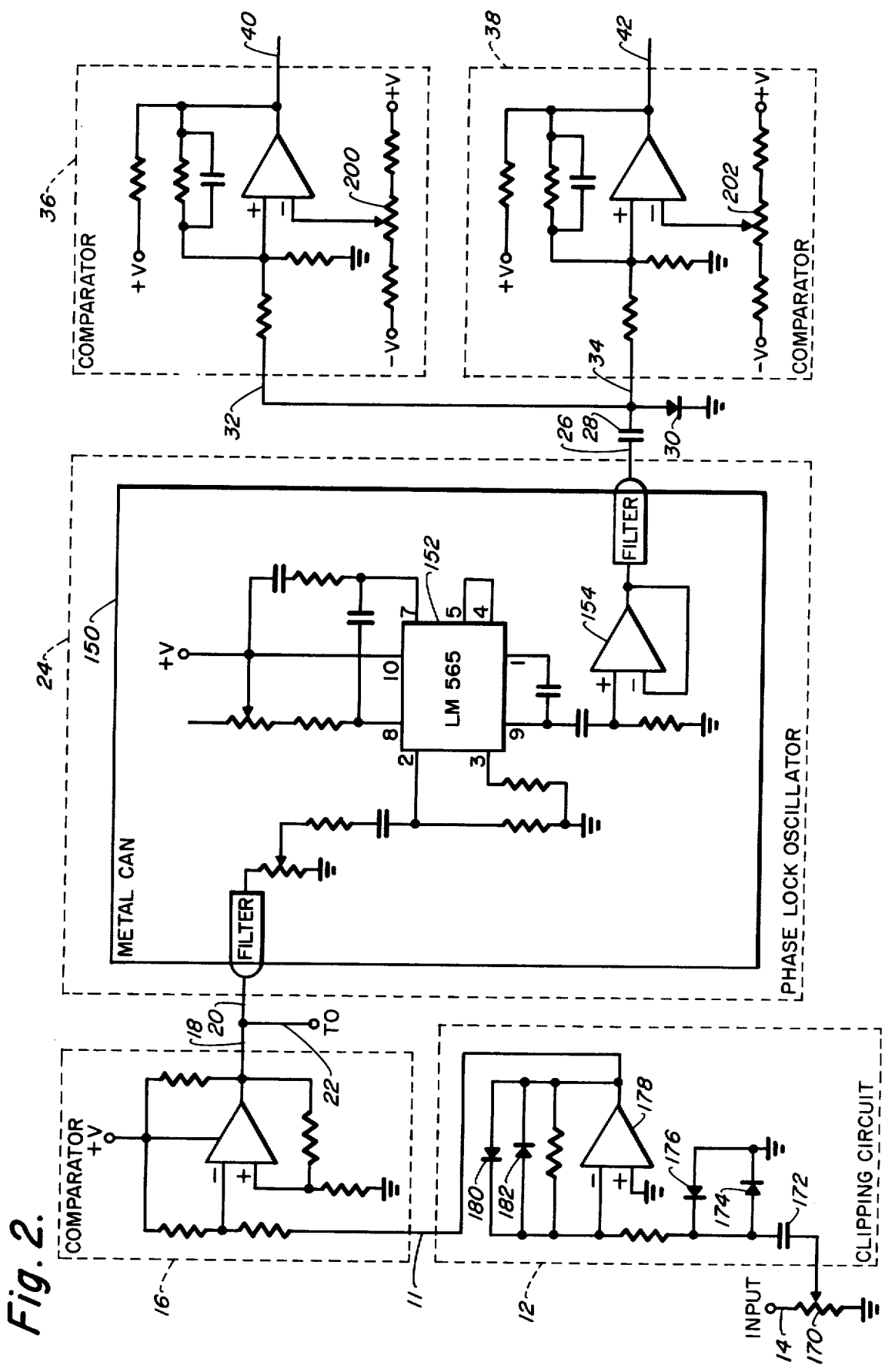
FIG. 2 is a schematic drawing illustrating portions of the embodiment illustrated in FIG. 1.

Now turning to FIG. 2, portions of the block diagram of FIG. 1 are shown in schematic illustration. The phase-lock-oscillator 24 is illustrated as enclosed within metal can 150. Phase-lock-oscillator 24 comprises an integrated circuit 152 labeled LM 565 with associated circuit elements followed by an operational amplifier 154. The phase-lock-oscillator 24 is designed to track the input frequency of the AC input signal shown in FIG. 3A with a long time constant. Therefore, the triangular wave on line 26 illustrated in FIG. 3E from phase-lock-oscillator 24 represents the average of the frequency of the AC input signal shown in FIG. 3A so long as the phase-lock-oscillator remains in the locked position.

Potentiometer 170 provides straight forward gain control while capacitor 172 prevents any DC voltage from reaching clipping circuit 12. Diodes 174 and 176 provide clipping while operational amplifier 178 in conjunction with diodes 182 and 180 provide additional gain and clipping. In addition, as the signal is coupled to the negative input of operational amplifier 178, the signal appearing on line 11 and shown in FIG. 3C is inverted. The signal on line 11 coupled to comparator 16, which has a small amount of hysterisis to maintain stability, inverts the signal on line 11 once and provides the TTL logic voltage level at its output on line 18. The signal on line 18 as shown in FIG. 3D is used to drive phase-lock-oscillator 24 as well as flip-flop 68.

The output of phase-lock-oscillator 24 on line 26 is coupled through capacitor 28 via lines 32 and 34 to comparators 36 and 38, respectively. The offset triangle wave on line 26 is coupled to the positive inputs of comparators 36 and 38 while the minus inputs to comparators 36 and 38 are coupled to potentiometers 200 and 202, respectively, which may be adjusted to set the threshold voltage levels at which the comparators 36 and 38 will trigger or switch. Both comparators 36 and 38 are designed with a small amount of hysterisis in order to maintain clean switching characteristics.

It will be appreciated by those skilled in the art that the complete circuit diagrams of FIG. 1 and FIG. 2 include such suitable and necessary bias voltage sources and related circuits as are usually provided in such circuits. All such biasing is not shown in FIG. 1 and FIG. 2.

Therefore, many modifications and embodiments of this specific invention will readily come to mind to one skilled in the art having the benefit of the teachings presented in the foregoing description and the accompanied drawings of the subject invention, and hence it is to be understood that the subject is not limited thereto and that such modifications, etc., are intended to be included within the scope of the appended claims.

What is claimed is:

1. An apparatus for synthesizing pulses from an AC input signal which is subject to degradation comprising:
   a. oscillator means responsive to said AC input signal for generating an AC output signal the frequency of which is the average frequency of said AC input signal over a plurality of cycles of said AC input signal;
   b. means responsive to said AC input signal and to said AC output signal for generating one output pulse for each cycle of said AC input signal;
   c. means responsive to said AC output signal for synthesizing one output pulse for each cycle of said AC input signal when the amplitude of said AC input signal is substantially diminished such that said pulse generating means does not function; and
   d. means responsive to said AC input signal for generation and synthesization of said output pulses after said AC input signal is not present for a predetermined period of time.

2. The apparatus of claim 1 wherein said pulse generating means generates one output pulse for each cycle of said AC input signal when said AC input signal is substantially obscured by noise.

3. The apparatus of claim 1 further including means coupled to receive said AC input signal for rendering said AC input signal compatible for driving said oscillator means.

4. The apparatus of claim 3 wherein said rendering means includes:
   a. a clipping circuit for transforming said AC input signal to a substantially square wave signal symmetrical about zero volts; and b. a comparator circuit for inserting a DC component in said square wave signal such that said square wave signal rides above zero volts.

5. An apparatus for synthesizing pulses from an AC input signal which is subject to degradation comprising:
   a. oscillator means responsive to said AC input signal for generating an AC output signal the frequency of which is the average frequency of said AC input signal over a plurality of cycles of said AC input signal;
   b. means responsive to said AC input signal and to said AC output signal for generating one output pulse for each cycle of said AC input signal, said output pulse generating means including
   means responsive to said AC output signal for commencing the generation of an enable signal prior to the negative-to-positive zero crossing of said AC input signal, means responsive to said AC input signal for commencing the generation of a start signal at the negative-to-positive zero crossing of said AC input signal, gate means coupled to receive said start and enable signals for generating an activation pulse when both said start and enable signals are present, means responsive to said activation pulse for generating one said output pulse for each activation pulse whereby said apparatus instantaneously follows phase variations in said AC input signal but still generates only one pulse for each cycle of said AC input signal when said AC input signal is obscured by noise, and means responsive to said output pulse, communicating with said start signal commencing means for terminating both said enable and said start signals upon the generation of one said output pulse; and
   c. means responsive to said AC output signal for synthesizing one output pulse for each cycle of said AC input signal when the amplitude of said AC input signal is substantially diminished such that said pulse generating means does not function.

6. The apparatus of claim 5 wherein said enable signal commencing means includes:
   a. a comparator coupled to receive said AC output signal, said comparator generating a comparator pulse prior to the negative-to-positive zero crossing of said AC input signal;
   b. a monostable multivibrator coupled to receive said comparator pulse, said multivibrator generating an one-shot pulse in response to said comparator pulse;
   c. a flip-flop coupled to receive said one-shot pulse, said flip-flop being set upon receiving said one-shot pulse, thereby commencing said enable signal.

7. The apparatus of claim 5 wherein said start signal commencing means includes a flip-flop responsive to said AC input signal, said flip-flop being set at the negative-to-positive crossing of said AC input signal.

8. The apparatus of claim 5 wherein said means for generating one said output pulse for each said activation pulse includes a monostable multivibrator.

9. The apparatus of claim 5 further including means responsive to said start signal and communicating with said enable signal commencing means for preventing the commencing of said enable signal when said start signal has not been commenced within a predetermined time period until such time as said start signal is commenced.

10. The apparatus of claim 9 wherein said preventing means includes a monostable multivibrator with a time constant equal to said predetermined time period.

11. An apparatus for synthesizing pulses from an AC input signal which is subject to degradation comprising:
   a. oscillator means responsive to said AC input signal for generating an AC output signal the frequency of which is the average frequency of said AC input signal over a plurality of cycles of said AC input signals;
   b. means responsive to said AC input signal and to said AC output signal for generating one output pulse for each cycle of said AC input signal; and
   c. means responsive to said AC output signal for synthesizing one output pulse for each cycle of said AC input signal when the amplitude of said AC input signal is substantially diminished such that said pulse generating means does not function, said output pulse syntehsizing means including means responsive to said AC output signal for commencing the generation of an enable signal prior to the negative-to-positive zero crossing of said AC input signal, means responsive to said AC output signal for generating a synthesizing control pulse after the negative-to-positive zero crossing of said AC input signal, gate means coupled to receive said enable signal and said synthesizing control pulse for generating an activation pulse when both said enable signal and said synthesizing control pulse are present, means responsive to said activation pulse for generating one said output pulse for each activation pulse whereby an output pulse is generated when the amplitude of said AC input signal is substantially diminished, and means responsive to said output pulse and communicating with said enable signal commencing means for terminating said enable signal upon the synthesization of one said output pulse.

12. The apparatus of claim 11 wherein said enable signal commencing means includes:
   a. a first comparator coupled to receive said AC output signal, said first comparator generating a first comparator pulse prior to the negative-to-positive zero crossing of said AC input signal;
   b. a monostable multivibrator coupled to receive said first comparator pulse, said multivibrator generating an one-shot pulse in response to said first comparator pulse; and
   c. a flip-flop coupled to receive said one-shot pulse, said flip-flop being set upon receiving said one-shot pulse thereby commencing said enable signal.

13. The apparatus of claim 11 wherein said synthesizing control pulse generating means includes:
   a. a second comparator coupled to receive said AC output signal, said second comparator generating a second comparator pulse after the negative-to-positive zero crossing of said AC input signal; and
   b. a second monostable multivibrator coupled to receive said second comparator pulse, said second multivibrator generating said synthesizing control pulse in response to said second comparator pulse.

14. The apparatus of claim 11 wherein said means for generating one said output pulse for each said activation pulse includes a monostable multivibrator.

15. The apparatus of claim 11 further including means responsive to said AC input signal and communicating with said enable signal commencing means for preventing the commencing of said enable signal when the amplitude of said AC input signal is substantially diminished for a time greater than a predetermined time period until such time as said amplitude of said AC input signal returns.

16. The apparatus of claim 15 wherein said preventing means includes a monostable multivibrator with a time constant equal to said predetermined time period.

* * * * *